March 24, 1931.  A. FRISCH  1,798,076
MEASURING DEVICE
Filed March 28, 1929
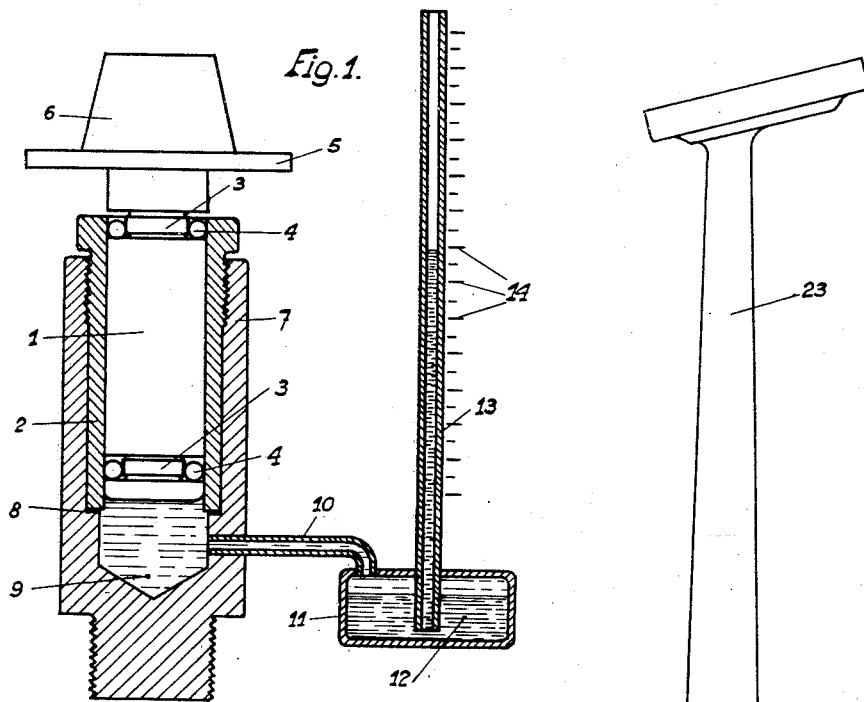
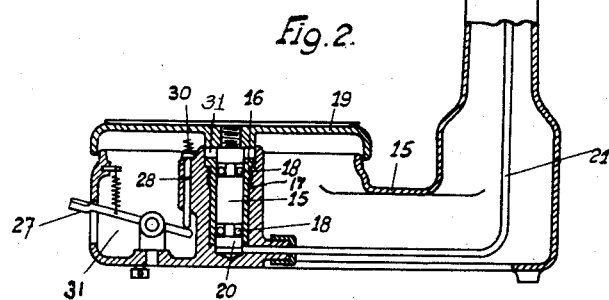
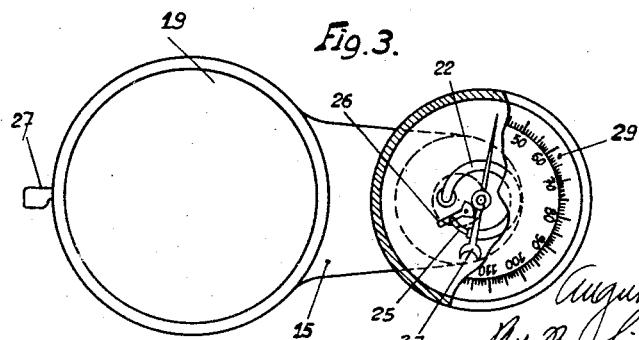

Patented Mar. 24, 1931

1,798,076

UNITED STATES PATENT OFFICE

AUGUST FRISCH, OF REBSTEIN, SWITZERLAND

MEASURING DEVICE

Application filed March 28, 1929, Serial No. 350,677, and in Switzerland April 3, 1928.

The present invention relates to a new and improved measuring device such as scales, indicator and so on comprising a cylinder with piston which is moved against the head of a liquid column when measuring takes place, and more especially to the particular means to guide the piston while under load.

The main object of the invention is to reduce friction and to keep the friction not only very low but constant to attain reliable results in measuring.

I attain this object by the use of balls or rollers which guide the piston accurately in the centre of the cylinder and which prevent the piston from touching the inner wall of the cylinder. The piston is kept truly co-axially to the cylinder even under heavy pressure and if the load exerted on the piston is eccentrically or obliquely directed to the piston axis. Any displacement of the piston out of the axis of the cylinder is obviated by said guiding means and no friction and no one-sided gap between piston mantle and the inner wall of the cylinder occurs even under great stress.

In the drawing the preferred mode of construction is shown by way of an example.

Fig. 1 illustrates the invention in a diagrammatical way the cylinder and the piston being shown in sectional side elevation.

Fig. 2 is a sectional elevation of a scale,

Fig. 3 shows the top view.

A piston 1 is slidably arranged within a cylinder 2. The piston 1 is provided near its upper end and near its lower end with a circular groove 3 in which balls 4 are placed. The piston 1 has some play in the cylinder 2 the outer wall of the piston 1 does not touch the inner wall of the cylinder, the balls 4 keep the piston 1 co-axial to the cylinder 2. The free annular space is very small the diameters differing but about 0,03 millimeters but it is sufficient to prevent metallic friction if the piston is moved axially. The piston 1 is provided with a plate 5 on which the load 6 is placed. The cylinder 2 is screwed in the container 7 a tight joint is obtained by the insertion of pointing material. The space of the container 7 below the piston 1 is filled with liquid 9 say oil, water etc. and communicates with a second container 11 partly filled with mercury 12. A vertical tube 13 projects with its lower end into the mercury 12. The load 6 presses the piston 1 into the cylinder the pressure applied to the liquid 9 is transmitted to the mercury 12 which ascends in the tube 13. The level of the mercury in the tube 12 may be read off on a graduation 14 which gives the weight of the load 6 etc. Instead of balls 4 rollers might be used, the balls, rollers etc. have all exactly the same diameter and the play of the balls between the grooves 3 and the inner wall of the cylinder is less than that between the outer wall of the piston 1 and the inner wall of the cylinder 2.

In Figs. 2 and 3 a scale is shown in which the new device is applied. In the frame 15 a cylinder 16 is arranged in which the piston 17 is mounted in the manner described above by means of balls 18. On the piston 17 the plate 19 is fixed on which the person stands. The space 20 of cylinder 16 beneath the piston 17 is connected by a pipe 21 with a curved tubular body 22, fixed at the upper end of a column 23 forming part of the frame 15. The tubular body 22 communicates with the pipe 21, it is partly stretched under the pressure of the fluid which fills the pipe 21 and the body 22 and this motion is transmitted by a link 25 and toothed lever 26 to a pointer 37 playing over a scale 29. The scale 29 is covered by a glass cover in the well known manner. In the frame 15 a lever 27 is journalled, one end projects through a vertical slot of the frame 15 the other end is linked to a pin 28 slidably mounted in a vertical bore of the cylinder body. To the upper end of the pin 28 a short coiled spring 30 is attached which on depressing the free end of lever 27 strikes against the plate 19. The plate 19 on being lifted draws the piston 17 upwards. The piston exerts a suction action on the liquid which might have passed along the inner wall of the cylinder into a collecting space 31. The liquid is returned thereby into the pipe 21.

What I wish to secure by U. S. Letters Patent, is:—

1. A measuring device comprising in combination a cylinder element, a piston element in said cylinder element, liquid adapted to be displaced by said piston, means to measure the pressure exerted by said piston on said fluid and means to prevent metallic friction of the piston on said cylinder, said means consisting in rotatably mounted bodies arranged in a groove with which one of said elements is provided.

2. A measuring device comprising in combination a cylinder element, a piston in said cylinder element, liquid adapted to be displaced by said piston, means to measure the pressure exerted by said piston on said fluid, and means to prevent metallic friction of the piston on said cylinder said means consisting in rotatably mounted balls arranged in a groove with which said piston is provided.

In testimony whereof I affix my signature.

AUGUST FRISCH.